March 24, 1953　　　J. C. KREJCI　　　2,632,713
CARBON BLACK PROCESS
Filed Oct. 29, 1948
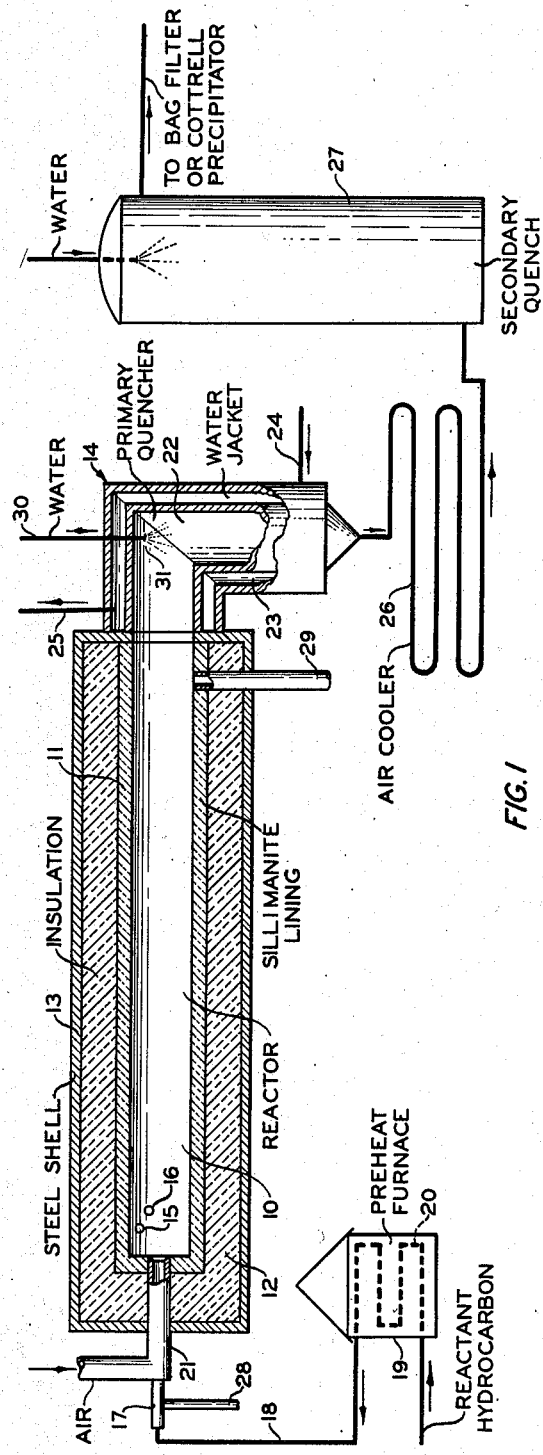
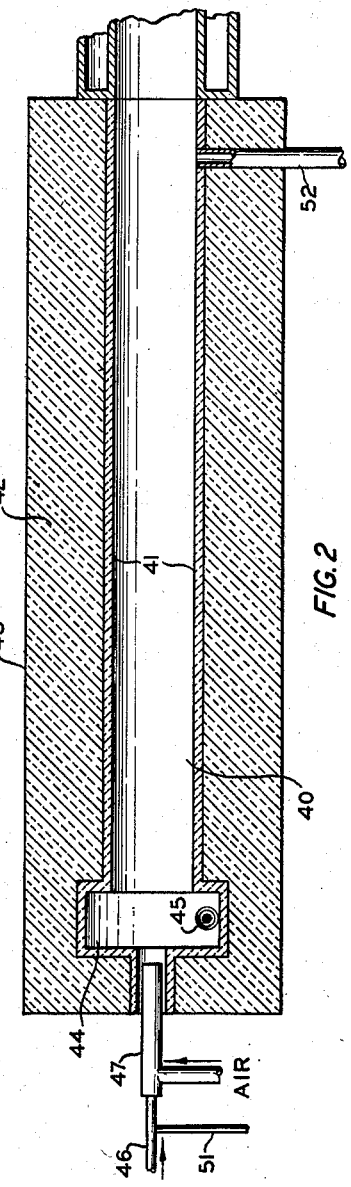
INVENTOR.
J. C. KREJCI
BY Hudson & Young
ATTORNEYS Patented Mar. 24, 1953

2,632,713

UNITED STATES PATENT OFFICE 2,632,713

CARBON BLACK PROCESS

Joseph C. Krejci, Phillips, Tex., assignor to Phillips Petroleum Company, a corporation of Delaware Application October 29, 1948, Serial No. 57,288

29 Claims. (Cl. 106—307)

1

This invention relates to the production of carbon black. In one of its more specific aspects it relates to a process for the production of an improved carbon black which when compounded with raw rubber or rubber-like material will yield a vulcanized product having improved properties.

Carbon black is now produced in large quantities by the use of furnaces. While the present invention can be applied to any furnace process for making carbon black it is preferred to apply the invention to furnace processes embodying the tangential or helical flame principle. These carbon blacks are very desirable for compounding in synthetic rubbers; they impart to the vulcanized rubber high resistance to abrasion, high modulus values and other desirable properties.

Carbon black made by this helical flame process may have a pH value of 9.0 to 10.0. The pH values of carbon black appear to be related to the scorching characteristics of the rubber mix of which the carbon black is an ingredient; carbon black having a high pH imparts to the rubber mixture a greater tendency to scorch during curing or vulcanization. Some carbon blacks have pH values higher than 10.

One object of this invention is to provide valuable carbon blacks and methods of making the same.

An object is to provide a process for the production of a furnace type carbon black possessing a relatively low pH value.

Another object is to provide a process for the production by the helical flame process of a furnace type carbon black which possesses a relatively low pH value.

Still another object is to provide a process for the production by the helical flame process of a furnace type carbon black which possesses a relatively low pH value without adversely affecting other properties of the black.

Another object is to provide an improved feed stock for carbon black processes.

Yet another object is to produce a carbon black capable of imparting increased abrasion resistance to synthetic rubber.

Still other objects and advantages will be apparent to those skilled in the art upon reading the following disclosure, which taken in conjunction with the attached drawing, forms a part of this specification.

2

Furnace blacks made by the helical flame process are produced by the controlled partial combustion of a gas or an oil. One such process for producing a furnace black is described in U. S. Patent 2,375,795. Other processes for producing carbon black are described in my copending applications, Serial Nos. 577,180, now abandoned, and 743,893, issued as Patent 2,564,700, April 21, 1951.

According to this invention, improved carbon black is made by incorporating an extraneous material into the carbon black during its manufacture. Such a material may be one or more materials selected from the group of silicon, boron, carbon and germanium oxides. The improved black is produced by mixing with the feed, as gas oil, to a carbon black furnace a combustible compound of one or more of the mentioned elements and exposing the same to incomplete combustion conditions in said furnace. Among such combustible compounds the following may be listed: alkyl silicates, such as tetraethyl orthosilicate; silicones, such as dimethyl silicone; silanes, such as trisilane ($Si_3H_8$); alkyl borates, such as trimethyl or triethyl borate; boranes, such as diborane ($B_2H_6$); and germanes, such as $GeH_4$.

Other combustible compounds of silicon, boron, or germanium may be used. Alkyl derivatives such as alkyl silanes, alkyl boranes, halogenated derivatives such as silicochloroform ($SiHCl_3$), silicobromoform ($SiHBr_3$), silicon chlorohydrosulfide ($SiCl_3SH$), halogenated alkyl boranes, halogenated alkyl silanes, and germanium bromoform ($GeHBr_3$) are examples. Alkenyl, aryl, cycloalkyl, and alkynyl derivatives of the previously mentioned compounds may also be used. Nitroaryl, nitrosoaryl, and nitroalkyl silanes and boranes are additional examples.

Silicon monoxide, SiO, may be added to the reacting material in the furnace.

The proportion of the combustible material added to the furnace feed or injected into the furnace is preferably controlled to produce a carbon black containing from about 0.01 to 10 weight per cent of boron, silicon or germanium.

In some cases, it is desirable to add to the carbon black feed stock more than one of the combustible compounds mentioned. For example, one suitable feed stock may comprise a gas oil containing minor amounts of an alkyl silicate and an alkyl borate.

Another material which may be added to a carbon black feed stock in accordance with my invention is the catalyst-soluble oil recovered from hydrofluoric acid-boron fluoride mixtures which have been used to catalyze hydrocarbon conversion reactions such as alkylation and isomerization. This may be obtained as a still residue when the spent catalyst is revivified by distillation. The oil residue may contain, in some cases, as much as 10 weight per cent or even more of boron. This boron is apparently organically combined.

The chemical behavior of the added compounds of silicon, boron, or germanium in the carbon black process is not fully understood. In some cases, particularly when the added compound is an organic borate or silicate, boron or silicon oxide is formed. Other combustion products, such as the free elements or carbides, may also be formed since conditions for the production of carbon black are highly reducing.

In the drawing, Figure 1 represents diagrammatically, partly in section and partly in elevation, one form of apparatus in which the process of my invention may be practiced. Figure 2 is a longitudinal section of a furnace which may replace the furnace illustrated in the apparatus of Figure 1.

Referring now to the drawing, and specifically to Figure 1, a reaction chamber 10 has a refractory lining 11. Between this lining 11 and a steel shell 13 is insulation material 12. A pipe 17, disposed axially, serves to conduct heated charge stock into the furnace. Openings 15 and 16 are ends of some tubes which extend through the chamber wall. These tubes are so positioned that that gases passing therethrough enter the furnace chamber in a direction tangent to the wall. A preheat furnace 19 contains coils 20 in which charge stock may be preheated prior to passage through a transfer pipe 18 and inlet tube 17 into the furnace. A tube 21 surrounds inlet tube 17 as illustrated, and it is intended that sufficient air be fed into the furnace through this tube 21 to prevent deposition of carbonaceous matter on the chamber end of the feed pipe 17. Of course, if for any reason whatever, some carbon did deposit on the end of the pipe 17, air from tube 21 will remove it by combustion.

At the downstream end of the furnace 10 is an effluent chilling apparatus 14. The pipe 22 carrying furnace effluent is surrounded by a water jacket 23 having an inlet connection 24 and an outlet connection 25 for passage of water. A pipe 30 conducts water from a source, not shown, to a spray nozzle 31 inside pipe 22 for chill cooling or quenching. The water jacket assembly is, of course, to prevent overheating of the conduit pipe 22. To the downstream end of the jacketed pipe section 14 is attached a pipe 26. This pipe serves as an air cooler and its length is dependent on the amount or degree of cooling of the furnace effluent desired. A secondary water quench 27 at the downstream end of the air cooled pipe serves to cool the material to a temperature suitable for separation treatment in a Cottrell precipitator or bag filter plant.

A tube or pipe 28 attached to the reactant hydrocarbon inlet pipe 17 is provided in case it is desired to inject the alkyl silicate or other combustible additive into the charge stock. However, the additive may be injected directly into the furnace, if desired, and when so added it should be added at a point sufficiently far upstream from the water quench that the material will be completely decomposed or burned before reaching the water quench. It is further preferred to operate the water quenches so that all the added water is vaporized and the carbon black product is not leached by liquid water, especially when the added feed constituent is a boron compound.

In the operation of the embodiment of the furnace of Figure 1, a mixture of fuel gas and air may be injected through the tangential burners 15 and 16, and burned in the furnace to heat it up to an operating temperature. When the furnace is sufficiently heated, preheated reactant hydrocarbon oil or gas is passed into the furnace through the burner tube 17. A small amount of air is added through pipe 21 to keep the furnace end of tube 17 free from carbon. The gas is turned off from the tangential burners and only air injected tangentially. The water spray is then put into operation to cool the furnace product.

When the furnace has been "lined out" and the carbon product "on test," the additive may then be turned into the reactant hydrocarbon stream through pipe 28 at such a rate that the composition of the final carbon black product will be that desired.

When the combustible additive is added into the reactant hydrocarbon stream, the combustion product, that is, the silica, etc., will be more or less uniformly dispersed through the carbon black. When the additive, however, is injected into the furnace at a point at which all or most of the carbon already exists as carbon black, the particles of carbon are for the most part merely coated with the combustion product of the added material. For coating the carbon particles, the additive may be injected into the furnace through a tube 29.

When gas is used as reactant feed to the furnace of Figure 1, it may be desirable to inject a gas-air mixture tangentially for heating while if oil is used as the source of carbon air alone may be injected tangentially for burning a portion of the oil to supply heat.

A second embodiment of my invention utilizes the furnace illustrated in Figure 2. In this figure, a reactor 40 has a refractory lining 41. A steel shell 43 containing some insulating material 42 surrounds the refractory liner. At the inlet end of this furnace is a short section 44 having a diameter some larger than that of the reactor section 49. This large diameter section is essentially a combustion chamber in which a combustible mixture of a gas, such as natural gas, and air, burns. This mixture is injected into the combustion chamber through an inlet tube 45 which is so positioned that the gases enter the chamber in a direction tangent to the cylindrical side wall. Upon continued injection of these gases, the flame and combustion products follow a spiral path toward the axis of the chamber. When the spiral reaches the diameter of the reactor section 40, the gaseous flow changes from a spiral to a helix and following this latter pattern the gases remain adjacent the reactor walls and finally pass into a jacketed spray cooler section similar to that illustrated in Figure 1. Reactant hydrocarbon gas or oil, from a source not shown, passes through a preheater, also not shown, and finally passes through a feed line 46 into the combustion end of the furnace. Air is passed through tube 47 which surrounds tube 46, for preventing carbon deposition on the furnace end of the tube 46.

As in the embodiment of Figure 1, the additive material may be injected into the hydrocarbon feed through a pipe 51 or it may be injected into the furnace through a pipe 52 at a point near the downstream end thereof.

The furnace of Figure 2 discharges its product into a jacketed spray cooler as illustrated in Figure 1. A pipe cooler, secondary spray, etc., are used with the furnace of Figure 2 just as they are with the furnace of Figure 1. These auxiliary apparatus parts are not shown in Figure 2 for purposes of simplicity.

In both embodiments of furnaces (Figures 1 and 2) it is preferable to vaporize the additive material and inject it in the vapor form into the reactant hydrocarbon feed pipe or less preferably into the furnace at a point near its downstream end.

If desired, at least a portion of the silicon, boron or germanium compound may be added to the tangential air-gas mixture of Figure 2 or to the tangentially added air injected into the furnace of Figure 1. The Si, B, or Ge compound may also be added together with the jacket air, as through pipe 21 or pipe 47.

*Example I*

A mixture comprising 83 parts by weight of gas oil and 17 parts by weight of triethyl borate is charged into the axial inlet of a cylindrical carbon black furnace. A combustible mixture of natural gas and air is charged through the tangential inlets of the furnace. The gas oil-ethyl borate mixture is converted, by the heat of the helical flame, to carbon black, which is recovered from the furnace effluent by means of electrical precipitators. The carbon black contains about 3.5 weight per cent of boron as the oxide and has a pH of about 5.3. Carbon black produced by the same procedure but without the use of ethyl borate has a pH of about 9.6.

*Example II*

A mixture comprising 77 parts by weight of gas oil and 23 parts by weight of tetraethyl orthosilicate is converted to carbon black by the process described in Example I. The recovered carbon black has a pH of about 8.5 and contains about 7.9 weight per cent of silicon as the oxide. The silicon-containing black imparts a higher abrasion resistance to synthetic rubber than silicon-free carbon black. The oxide of the element may constitute up to about 10 per cent by weight of the final carbon black product.

One mode of operation of the furnace of Figure 1 is fully described in U. S. Patent 2,375,795, when using a gas feed. In a copending application, Serial No. 577,180, now abandoned, another mode of operation is described when using an oil feed in the furnace of Figure 1. One mode of operation of the furnace of Figure 2 is fully described in a copending application, Serial No. 743,893, now Patent 2,564,700.

My process is not intended to be limited to the use of a recycle gas oil, as hereinbefore described, as the carbon containing feed stock. Other oils, such as kerosene, gasoline boiling range hydrocarbons, heavy or light naphthas or oils even heavier than recycle gas oils may be used. Such hydrocarbon materials as natural gas, either dry gas, wet or raw natural gas as it comes from a gas well, or gasoline extraction plant or refinery residue gas may be used. Further, heavier hydrocarbons than normally gases may be used as charge, such as butane, pentane or the like. Broadly, most any hydrocarbon can be used as feed in my process. The feed may be injected as a liquid through a spray or atomizer, although I prefer to operate with the feed injected as a vapor. Hydrocarbons from other sources than petroleum likewise are suitable, as for example, low temperature coal gas, coal tar distillates, shale gases and distillates may be used. These charge stocks may contain most any class of hydrocarbon compound, as for example, saturated or unsaturated hydrocarbons, paraffins, olefins, aromatics, naphthenes or any others which might become available. A gas oil such as that hereinbefore described is, however, a preferred feed stock.

The process hereinbefore described for the production of carbon black containing the oxide of B, Si or Ge is merely illustrative of the production of an improved carbon black. The improved carbon black may be made in other furnaces under other operating conditions as well as by a modification of the channel process. Where a gas is used as the carbon-containing feed stock, a volatile silicon, boron or germanium compound, such as methyl or ethyl orthosilicate, methyl or ethyl orthoborate, and germanium chloroform or ethide may be used. As mentioned hereinbefore most any combustible compound of these metals may be used. For use with a hydrocarbon gas the vapors of the volatile compound may be added to the hydrocarbon gas, or in the case the volatile compound is difficultly volatile the hydrocarbon gas feed may be passed through heated liquid for vaporization, or the latter may be sprayed into the heated gas.

In furnace processes operating on hydrocarbon oils the combustible compound need not be especially volatile since the compound may be mixed with the liquid hydrocarbon, or may be injected or sprayed separately into the furnace. While I have given as illustrative embodiments some examples using the helical flame furnaces which are shown in my prior patents cited above, my invention is not limited thereto but is clearly applicable to other furnace carbon black processes, such as those set forth in Ayers Re. 22,886 of June 3, 1947; Hanson, 2,368,828, of February 6, 1945; Miller, 1,807,321, of May 26, 1931; Wiegand, 2,378,055, of June 12, 1945; and 2,440,424, of April 27, 1948, and numerous other furnace processes.

Having disclosed my invention, I claim:

1. A process for producing an improved reinforcing agent for rubber compounding comprising introducing air into an elongated cylindrical reaction zone at a plurality of spaced ports in the side walls of said zone, each port arranged to discharge an air stream circumferentially of said zone, providing an axial stream in the gaseous state of a mixture of a hydrocarbon and a combustible compound of an element selected from the group of elements consisting of silicon, boron and germanium in the reaction zone, admixing the hydrocarbon and combustible compound of said element in said gas streams, regulating the amount of air supplied to said zone to provide for combustion of said combustible compound of said element and for combustion of a portion of the hydrocarbon to generate sufficient temperature within said zone to decompose the unburned portion of the hydrocarbon, cooling the products of combustion and decomposition and separating the produced reinforcing agent from the gaseous products.

2. A process for producing an improved reinforcing agent for rubber compounding comprising providing at hydrocarbon cracking temperatures a reaction zone bounded by a cylindrical heat-insulating refractory wall, introducing air into said zone in a direction tangent to the inner periphery of said wall so as to maintain adjacent thereto a helically moving annular stream, providing in said zone inside and axially with respect to said annular stream a stream in the gaseous state of a mixture of hydrocarbons and a combustible compound of an element selected from the group of elements consisting of silicon, boron and germanium, so that the respective streams mingle and react within said zone, regulating the quantities of air and hydrocarbon in the respective streams so that the combustible compound is burned to an oxide and enough of the hydrocarbon is burned in said zone to maintain the desired hydrocarbon cracking temperature therein while substantially the remainder of the hydrocarbon is cracked to elementary carbon, cooling to a nonreactive temperature the reaction products containing gases, suspended carbon and oxide of said element, and thereafter recovering as a mixture the carbon and said oxide.

3. In a process of producing a finely divided carbonaceous product, the steps which comprise providing at a carbon black forming temperature a reaction zone bounded by cylindrical heat-insulating refractory wall, providing axially in said zone a continuous stream of a mixture of vaporized hydrocarbons and a combustible compound of an element selected from the group of elements consisting of silicon, boron and germanium, forcing a gas comprising air into said zone in a tangential stream so as to maintain a spirally moving gaseous stream comprising air so that the axial vaporous stream and the annular stream of gas impinge and react in a swirling condition in said zone, so proportioning the supplies of air, hydrocarbons and combustible compound of said element that enough of the hydrocarbons is burned to maintain hydrocarbon cracking temperatures in said zone while substantially the remainder of the hydrocarbons is cracked therein to elementary carbon and the combustible compound is converted to its oxide, conducting the resulting reaction products from said zone and thereafter recovering the carbonaceous product containing an oxide of said element from said products.

4. A process for producing a finely divided carbonaceous product comprising passing fuel and air spirally inward in a cylindrical zone having a diameter greater than its length and burning said fuel in said zone, passing the products of combustion and nitrogen from this first zone helically into a second cylindrical zone having a smaller diameter and a greater length than the first zone; introducing a mixture of hydrocarbon and a combustible compound of an element selected from the group of elements consisting of silicon, boron and germanium, axially into the first zone, heating said hydrocarbon and combustible compound of said element therein, said hydrocarbon and combustible compound of said element passing axially into said second zone, converting said hydrocarbon to carbon black and the combustible compound to an oxide in this second zone, removing gaseous effluent containing suspended carbon black and oxide of said element from the second zone and recovering the finely divided carbonaceous product.

5. A process for producing a finely divided carbonaceous product comprising injecting a combustible mixture of gaseous fuel and air tangentially into a first cylindrical zone of diameter greater than its length and burning said fuel completely in said zone, passing the products of combustion containing some uncombined oxygen from this zone into one end of a long second cylindrical zone of length greater than its diameter, and of diameter less than the diameter of the first zone; said injection of said mixture of gaseous fuel and air into the first zone being at a sufficiently high velocity that said fuel and air and resulting products of combustion, nitrogen and some free oxygen follow an inward spiral path in the first mentioned zone and the products of combustion, nitrogen and some free oxygen follow a helical path adjacent the cylindrical walls of said second zone; introducing a vaporous mixture of hydrocarbon and a combustible compound of an element selected from the group of elements consisting of silicon, boron and germanium axially into the first mentioned zone at the end opposite the combustion products outlet, heating said hydrocarbon and combustible compound of said element therein out of contact with said burning gaseous fuel, and passing said vaporous hydrocarbon and combustible compound of said element axially from said first zone into said second zone whereby in this latter zone reactions to carbon black and to oxide of said element occur; removing gaseous effluent containing suspended carbon black and said oxide from said second zone and recovering the carbonaceous product.

6. The process of claim 5 wherein the hydrocarbon introduced axially into the first zone comprises a normally liquid hydrocarbon oil.

7. The process of claim 5 wherein the hydrocarbon introduced axially into the first zone comprises a gas oil.

8. The process of claim 3 wherein the vaporized hydrocarbon provided axially comprises a normally liquid hydrocarbon oil.

9. The process of claim 3 wherein the vaporized hydrocarbon provided axially comprises a gas oil.

10. The process of producing a finely divided carbonaceous product comprising continuously introducing a mixture of a gas oil and a combustible compound of an element selected from the group of elements consisting of silicon, boron and germanium, in a vaporous state into the inlet end and at a midpoint of a short cylindrical combustion zone having an inlet end wall and an outlet end wall, said outlet end wall having a circular opening concentric with respect to the periphery of the zone, introducing into the combustion zone through a burner port a combustible mixture containing an excess of free oxygen and burning the same to heat the vaporous gas oil and combustible compound of said element by direct heat exchange, said burner port being positioned to direct the flow of said combustible mixture and excess oxygen in a direction tangent to the inner surface of the cylindrical side wall and perpendicular to the longitudinal axis of said zone to give a spirally inward motion to the flame and combustion product; moving the heated gas oil and combustible compound of said element into the inlet end of an unobstructed elongated cylindrical zone having a diameter smaller than the diameter of the first mentioned zone, the inlet end of said elongated zone forming the opening in the outlet end wall of said first mentioned zone and said zones having a common longitudinal axis, the spiral motion imparted to the combustion products in the combustion zone acting to move said hot combustion products and free oxygen helically and as a hollow rotating cylinder surrounding said heated gas oil and combustible compound of said element as a core through the second zone, said helically moving hot combustion products and oxygen moving through said second zone heating further the hot gas oil and combustible compound of said element and converting carbon therefrom to elementary carbon and said combustible compound of said element to an oxide of said element; cooling the effluents of the second and elongated zone to a temperature below that at which said elementary carbon is reactive, and separating the carbonaceous product from the suspending gases and removing same as the finely divided carbonaceous product of the process.

11. A process for producing an improved reinforcing agent for rubber compounding comprising providing at hydrocarbon cracking temperatures a reaction zone, introducing into said zone air, a hydrocarbon and a combustible compound of an element selected from the group consisting of silicon, boron and germanium in such a manner and in such proportion that enough hydrocarbon is burned to maintain the hydrocarbon cracking temperatures in said zone while the remainder of the hydrocarbon is cracked therein to elementary carbon and the combustible compound is converted to its oxide, removing the resulting reaction products from said zone and thereafter recovering the rubber reinforcing agent.

12. A process for producing an improved carbon black product which comprises introducing a hydrocarbon in the vapor state and a combustible compound of an element selected from the group consisting of silicon, boron, and germanium into a conversion zone introducing sufficient oxygen-containing gas to burn said combustible compound and a portion of said hydrocarbon to provide sufficient heat to decompose the remainder of said hydrocarbon to carbon and recovering solids from the effluent from said zone as said improved carbon black product.

13. The method of claim 2 wherein said combustible compound is tetraethyl orthosilicate.

14. The method of claim 4 wherein said combustible compound is a tetraethyl orthosilicate.

15. The method of claim 2 wherein said combustible compound is a trialkyl borate.

16. The method of claim 2 wherein said combustible compound is a triethyl borate.

17. The method of claim 2 wherein said combustible compound is a trimethyl borate.

18. The method of claim 4 wherein said combustible compound is a trialkyl borate.

19. The method of claim 4 wherein said combustible compound is a triethyl borate.

20. The method of claim 4 wherein said combustible compound is a trimethyl borate.

21. A composition of matter comprising a carbon black containing a minor but effective amount not over 10 per cent by weight of a pH reducing agent selected from the group consisting of the oxides of silicon, boron and germanium and made by subjecting a hydrocarbon feed stock with a combustible compound of one of said elements to incomplete combustion with the evolution of sufficient heat to decompose the remainder of the hydrocarbon feed stock to carbon black and recovering the carbon black containing the pH reducing agent.

22. A composition of matter comprising a carbon black containing a minor but effective amount not over 10 per cent by weight of boron oxide and made by subjecting a hydrocarbon feed stock with a combustible compound of boron to incomplete combustion with the evolution of sufficient heat to decompose the remainder of the hydrocarbon feed stock to carbon black and recovering the composition.

23. A process for producing an improved carbon black product which comprises introducing a hydrocarbon in the vapor state and methyl orthosilicate into a conversion zone, introducing sufficient oxygen containing gas to burn said methyl orthosilicate and a portion of said hydrocarbon to provide sufficient heat to decompose the remainder of said hydrocarbon to carbon and recovering solids from the effluent from said zone as said improved carbon black product.

24. A process for producing an improved carbon black product which comprises introducing a hydrocarbon in the vapor state and ethyl orthosilicate into a conversion zone, introducing sufficient oxygen containing gas to burn said ethyl orthosilicate and a portion of said hydrocarbon to provide sufficient heat to decompose the remainder of said hydrocarbon to carbon and recovering solids from the effluent from said zone as said improved carbon black product.

25. A process for producing an improved carbon black product which comprises introducing a hydrocarbon in the vapor state and methyl orthoborate into a conversion zone, introducing sufficient oxygen containing gas to burn said methyl orthoborate and a portion of said hydrocarbon to provide sufficient heat to decompose the remainder of said hydrocarbon to carbon and recovering solids from the effluent from said zone as said improved carbon black product.

26. A process for producing an improved carbon black product which comprises introducing a hydrocarbon in the vapor state and ethyl orthoborate into a conversion zone, introducing sufficient oxygen containing gas to burn said ethyl orthoborate and a portion of said hydrocarbon to provide sufficient heat to decompose the remainder of said hydrocarbon to carbon and recovering solids from the effluent from said zone as said improved carbon black product.

27. A process for producing an improved carbon black product which comprises introducing a hydrocarbon in the vapor state and germanium chloroform into a conversion zone, introducing sufficient oxygen containing gas to burn said germanium chloroform and a portion of said hydrocarbon to provide sufficient heat to decompose the remainder of said hydrocarbon to carbon and recovering solids from the effluent from said zone as said improved carbon black product.

28. A composition of matter comprising a carbon black containing a minor but effective amount not over 10 per cent by weight of silicon dioxide and made by subjecting a hydrocarbon feed stock with a combustible compound of silicon to incomplete combustion with the evolution of sufficient heat to decompose the remainder of the hydrocarbon feed stock to carbon black and recovering the composition.

29. A composition of matter comprising a carbon black containing a minor but effective amount not over 10 per cent by weight of germanium oxide and made by subjecting a hydrocarbon feed stock with a combustible compound of germanium to incomplete combustion with the evolution of sufficient heat to decompose the remainder of the hydrocarbon feed stock to carbon black and recovering the composition.

JOSEPH C. KREJCI.

REFERENCES CITED

The following references are of record in the file of this patent:

UNITED STATES PATENTS

| Number | Name | Date |
|---|---|---|
| 1,807,321 | Miller | May 26, 1931 |
| 1,868,921 | Schmidt et al. | July 26, 1932 |
| 1,903,705 | Nikaido | Apr. 11, 1933 |
| 1,943,246 | Towne | Jan. 9, 1934 |
| 1,999,573 | Odell | Apr. 30, 1935 |
| 2,346,157 | Farrington et al. | Apr. 11, 1944 |
| 2,368,828 | Hanson et al. | Feb. 6, 1945 |
| 2,378,055 | Wiegand et al. | June 12, 1945 |
| 2,462,616 | Eby et al. | Feb. 22, 1949 |